3,479,569
METHOD AND APPARATUS FOR RELEASING ELECTRIC ENERGY
Gérard Prost, Paris, and Jean Sole, Clamart, France, assignors to Commissariat à l'Energie Atomique, Paris, France
Filed Nov. 9, 1966, Ser. No. 593,133
Claims priority, application France, Nov. 9, 1965, 37,843
Int. Cl. H01h 47/22
U.S. Cl. 317—123      15 Claims

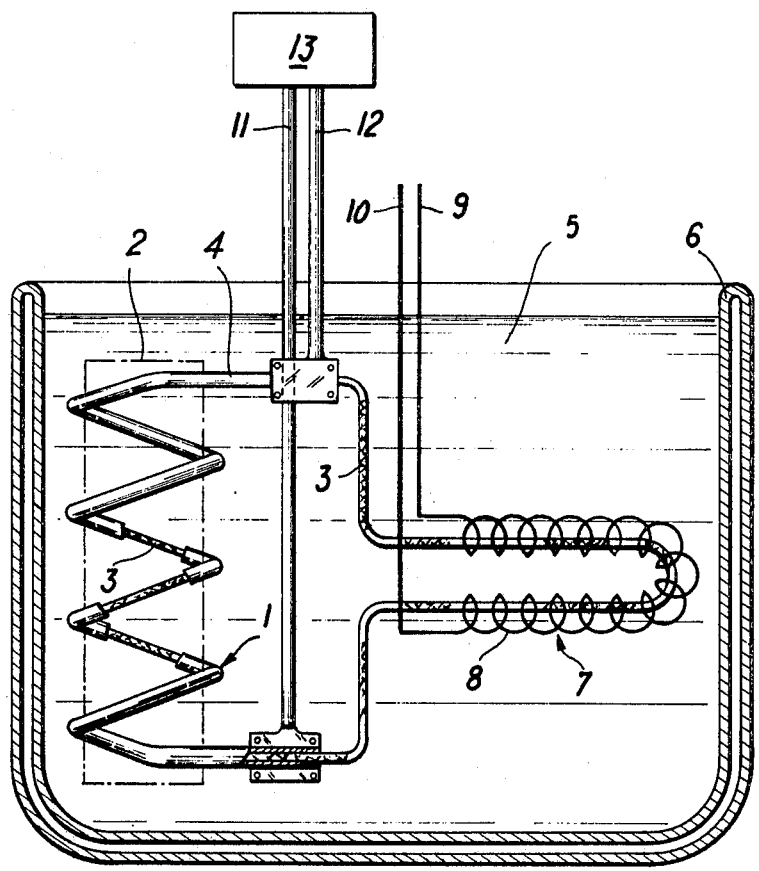

ABSTRACT OF THE DISCLOSURE

An apparatus for storing and releasing electrical energy which comprises a conducting circuit made of a material which is capable of assuming a normal state or a superconducting state, means for bringing said circuit to the superconducting state, an outer metallic sheet which covers said circuit over a part of its length, said sheet being in electrical contact with said circuit and having a low electrical resistance compared with the resistance of said circuit in the normal state, a switching means placed in said circuit in a zone which is not covered by said sheet, means for controlling said switch for opening said circuit, means for introducing an electrical current into said circuit and terminal conductors for coupling said sheet directly to a load circuit.

---

The present invention relates to a method and apparatus for releasing stored electrical energy into a load circuit at a given moment. More particularly, the present invention concerns a method and apparatus for releasing electrical energy, said energy having previously been stored in a circuit which is separate from said load circuit and which is maintained in a state of superconductivity.

It is well known that the storage and release of electrical energy can be effected by means of banks of capacitors which are charged at a given voltage, the energy thus stored being restored in the form of a discharge current. However, this method is attended by a number of disadvantages arising from the relatively low value of the energy which is stored in one capacitor unit volume, the storage time which is necessarily short because of the leakage of the current which is impossible to reduce to zero in the dielectric material employed for insulating the capacitor plates, the low efficiency with which electrical energy is restored during the discharge of said capacitors, and the wave-form of the discharge current which is obtained.

It is also known to introduce and to store electrical energy in a superconducting circuit which is designed in the form of a winding and arranged in a closed loop, primarily for the purpose of producing intense magnetic fields. A winding of this type has to be stabilized, for example, by short-circuiting a number of its turns, or by making provisions for a metallic central core to prevent any danger of local attainment of the critical field and of any resulting accidental transition of the circuit from the superconducting state to the normal state. In windings of this type, a release of stored energy by means of the circuit itself which is directly coupled to a load circuit, is made difficult if not actually impossible, by reason of the fact that in a transient state, the superconducting circuit has a tendency to lose its properties as soon as it is opened because variations of magnetic flux in the winding produce local and multiple transitions.

Accordingly, it is an object of the present invention to overcome the many disadvantages in the prior art.

Another object of the present invention is to provide a method and apparatus for releasing stored electrical energy into a load circuit.

A further object of the present invention is to provide a method and apparatus for releasing electrical energy into a load circuit at a given moment, said energy having previously been stored in a circuit which is separate from said load circuit and which is maintained in a state of superconductivity, that is, a state in which the electrical resistance of the circuit is zero under given conditions of temperature and magnetic field.

A still further object of the present invention comprises a method and apparatus for preventing dissipation into the storage circuit and into the circuit-stabilizing elements during the release of energy to the load circuit and for making it possible to insure a high degree of efficiency, even in the case of very fast transients.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a new method and apparatus for releasing stored electrical energy into a load circuit, may be obtained, if a conducting circuit is covered by an external metallic sheath which provides a coupling with a load circuit to which the sheath restores practically the entire amount of stored energy after opening and controlled transition of the conducting circuit by means of a special switch.

Broadly, the present invention comprises a system wherein energy is stored in a conducting loop circuit which is maintained in a superconducting state, said circuit being covered over a part of its length with an external metallic sheath. This sheath has a low electrical resistance compared with the resistance of said circuit in the normal state and is in electrical contact with said circuit. According to the present invention, a load circuit is coupled to said sheath by means of terminal conductors, the conducting circuit is opened at a desired moment by means of a switch, and the stored energy is released to the load circuit through said sheath and terminal conductors. The switch is located in the conducting circuit in that zone which is not covered by said sheath.

In the remainder of the description, the expression "superconducting state" will be employed in contradistinction to the "normal state" in order to define the characteristics of a circuit, depending on whether said circuit is either in a state of superconductivity or has zero electrical resistance.

The apparatus used in the practical application of the method according to the present invention is characterized in that it comprises in combination a conducting circuit made of a material which is capable of assuming the normal state or the superconducting state, a means for bringing said circuit to the superconducting state, an outer metallic sheath which covers said circuit over a part of its length, said sheath being in electrical contact with said circuit and having a low electrical resistance compared with the resistance of said circuit in the normal state, a switch placed in said circuit in a zone which is not covered by said sheath, means for controlling said switch for opening said circuit, means for introducing an electrical current into said circuit and terminal conductors for coupling said sheath directly to a load circuit.

In one of the desired features of the present invention, the means used for bringing the conducting circuit to the superconducting stat comprises a cryostatic vessel filled with a liquefied gas in which said circuit is immersed. As a further advantageous feature, the switch which is placed in said conducting circuit in a zone not covered by said sheath is composed of a resistance-type heater element which surrounds a portion of said circuit to initiate the transition of said portion from the superconducting state to the normal state by passing an auxiliary current through said resistance element. Additionally, the switch can be a mechanical circuit-breaker in which the separable contacts are superconducting. In any event, the switch can be constituted by any equivalent system which permits the abrupt variation in the ohmic resistance of said circuit. The means for controlling said switch can also be of any suitable type provided that it permits the transition of the switch from the superconducting state to the normal state where the ohmic resistance thereof has an increased value. In particular, it is also possible to contemplate any means for generating a local magnetic field which is higher than the critical field of the switch, that is to say the critical field which is produced at the temperature considered as a result of the geometry of the switch and the composition of the material employed in the fabrication of said switch.

In order to prevent energy from being dissipated into the external metallic sheath of the conducting circuit during the release of said energy to the load circuit and in order to permit fast discharges with high efficiency, said sheath necessarily possesses a very low ohmic resistance at the operating temperature within the cryostat. Thus, the sheath can be given a larger surface area by increasing its thickness or by incorporating conductive strands or layers which are fabricated either of the same material as the sheath or of different materials and which may or may not be in contact with said sheath. Also, the conducting circuit can be formed by a wire which is preferably wound in a coil, the turns of which being insulated from each other. Further, the conducting circuit can be formed by any other suitable means such as, for example, metallic ribbon, thin sheeting, tubing, rods or bars and the like.

The above features may be employed either in combination or independently according to the particular requirements and will become apparent from the following description of one example of construction of the present invention, which is given by way of illustration only, and therefore is not to be considered as limiting. In considering the following discussion, it should be remembered that superconducting windings have already been employed for the purpose of producing intense magnetic fields by effecting in such windings the storage of current which circulates indefinitely without any loss of energy. In order to protect such windings from the destructive action which results from an abrupt accidental and local transition of a portion of the superconducting circuit to the normal state, it is also known to provide the windings with an outer metallic sheath which is in electrical contact with the superconducting circuit and short-circuited with itself if necessary so as to shunt said superconducting circuit and permit the removal and dissipation of the energy which has previously been stored in said circuit. However, according to the present invention, the external metallic sheath does not solely serve to protect the conducting circuit as in known systems but provides a coupling with a load circuit to which said sheath restores practically the entire amount of stored energy after opening and controlled transition of the conduting circuit by means of a special switch.

In the accompanying drawing, the single feature is a diagrammatic, vertical, sectional view of an apparatus used in the practical application of the method according to the present invention.

In referring more specifically to the accompanying drawing, the conducting circuit which effects the storage of electrical energy according to the present invention is composed of an induction coil 1 comprising a winding on a central core 2 fabricated of electricall insulating material, and a lead-wire 3 formed of electrically conductive material and capable of exhibiting superconductive properties at a sufficiently low temperature. The turns of the lead-wire which are insulated from each other are coupled to an external metallic sheath 4 which surrounds the wire over a portion of its length and is in electrical contact with said wire. The sheath is fabricated of a metal which possesses good electrical and heat conductivity, such as for example, copper or aluminum, since these metals insure protection of the lead-wire and have a sufficiently low ohmic resistance to be capable of carrying high currents without overheating and consequently without any substantially loss of energy. It should be noted, however, that any energy which is lost due to overheating within the sheath is, in any case, negligible compared with the energy which is stored in the lead-wire.

A good electrical contact between the lead-wire and its metallic sheath can advantageously be provided by adopting a suitable constructional design of the assembly, for example, by depositing the sheath metal on the lead-wire, or by forming a cable having a core of superconducting material and a sheath comprising a plurality of metallic wires coiled around the outer face of said core. The metallic sheath can also be provided in the form of a metallic ribbon of substantial thickness in which are embedded either one or a number of superconducting wires. In any case, the sheath or covering of the lead-wire should preferably be fabricated of a metal having a very low magnetic resistance, taking into account the influence of the magnetic field of the coil.

The inductance coil as thus described as immersed in a volume 5 of liquefied gas, for example, liquid helium, which is contained in a cryostatic vessel 6. The lead-wire is enclosed within a loop by means of a switch 7 located in that part of the circuit where said lead-wire is not provided with an outer sheath. The switch comprises a simple coil 8 of a resistance-type heater element which surrounds a portion of the lead-wire and communicates through terminal leads 9 and 10 with the outside of the vessel to a source of voltage, not shown. A flow of current through the resistance coil produces, by the Joule effect, an evolution of heat which accordingly raises the temperature of the lead-wire in the zone of switch 7. Unthe these conditions, the lead-wire which exhibits superconducting properties because of its composition and the temperature to which it has been brought as a result of its immersion in liquid helium, loses these properties locally as soon as a current is passed through the resistance coil. On the other hand, as soon as current is no longer passed through the resistance coil, the lead-wire reverts to its initial state wherein it recovers its superconducting properties. The switch thus performs the function of a veritable circuit-breaker.

The ends of the external metallic sheath are connected to terminal conductors 11 and 12 which pass out of the vessel. The conductors can then be connected to the various equipment units which are necessary to effect the method of the present invention. The ends of the terminal conductors can be joined to the ends of the sheath, for example, by clamping or any similar expedient over a fairly large area, taking into account the high current density which is to be released to the load circuit by means of the terminal conductors. In the situation where the sheath is composed of lengths of wire which are wound around the lead-wire, direct connection with the terminal conductors can be accomplished. Furthermore, it should be noted that the sheath can advantagueously be covered with electrical insulating material, which is effective in preventing short-circuiting between the different turns of the coil. This is particularly true when the sheath is fabricated of aluminum. In such a case, the insulating material will consist of alumina which is obtained by slightly oxidizing the surface of the sheath.

The method in accordance with the present invention can be put into practice by using the apparatus as hereinabove described. First of all, in order to effect the storage of electrical energy in the circuit of the lead-wire in the superconducting state, the switch is changed over to the normal state by producing a local increase in the temperature of the wire to a point above the critical temperature at which said wire loses its properties. A charge current $i_0$ is then progressively established in the inductance coil by means of the terminal conductors which are connected to a current generator 13, the progressive increase in the value of the current being necessary in order to prevent accidental transitions of the conducting circuit before the entire amount of energy to be stored has been transferred.

Then, while the aforesaid current $i_0$ which is delivered by the generator is maintained constant, the current supplied through the resistance coil is cut off, thereby restoring the switch to its initial state. The circuit of the lead-wire accordingly reverts entirely to the superconducting state and traps the current $i_0$. The value of the current delivered by the generator is then progressively reduced and the generator is disconnected.

Provided the assembly consisting of the inductance coil and the switch is maintained in the superconducting state, it is then possible to retain over an indefinite period the energy which is stored in the circuit. This energy can be defined by the equation $W = \frac{1}{2} L i_0^2$, wherein L designates the coefficient of inductance of the circuit, that is to say, of the inductance coil and of that portion of the circuit which is located in the resistance coil, the inductance of which is established by design at a very low value.

In order that the energy thus stored may subsequently be released, the terminal conductors are connected to a load circuit which has not been shown in the drawings but which can be disposed in the same position as the generator, previously employed. The switch is then changed from the superconducting state to the normal state by means of the heating resistance coil in such a manner that the ohmic resistance of the switch is substantially increased and the current $i_0$ which initially flowed through the switch, is shunted to the load circuit through the sheath which is electrically coupled to the lead wire. The energy contained in the lead-wire in the superconducting state is transferred both by magnetic coupling and by electrical contact to the sheath, then through the terminal conductors to the load circuit. The loss of energy within the switch during this energy transfer is always relatively low due to the high resistance of the switch compared with the impedances which are disposed in parallel therewith. In the normal state, the resistance of the switch in tht portion of the zone of the wire which is not covered with the sheath is at a maximum value while the current which passes through the switch is practically negligible compared with the current which is shunted through the sheath and the terminal conductors.

By way of example, in the case of a solenoid composed of four cables in parallel, each cable being made up of seven wires in parallel so as to form a coil having an internal diameter which is equal to 17 cm., an external diameter which is equal to 19.7 cm., a length of 4 cm., and an inductance coefficient of 2.3 millihenries, a charge current of 1400 amps. is permissible and 95% of the energy which has been stored in said solenoid, namely 2,250 Joules, can be released in 14 milliseconds. The energy density which is stored in a solenoid of this type is 7 Joules/centimeter$^2$.

As has already been stated, a large number of variance of the arrangements described hereinabove could, of course, be contemplated without departing from the scope of the present invention. Thus, for example, the inductance coil could be replaced by a superconducting circuit having any other desired configuration so that the energy can be stored in electromagnetic form in the same manner, and introduced by direct coupling with a current generator as hereinabove described or by any other suitable means, such as a flux pump. The stored energy can also be recovered at different voltages by means of secondary circuits coupled by induction with the main load circuit which is connected to the terminal conductors.

Provision can also be made for different terminal branches for the purpose of connecting the conducting circuit to the current generator on the one hand and to its load circuit on the other hand, the discharge time being substantially shorter than the charge time, with the result that lower heat energy is generated.

As previously stated, the metallic sheath of the superconducting wire is composed of a good electrical conducting material having a reduced magnetic resistance at low temperatures. Among the materials which can advantageously be used include, for example, pure aluminum, copper and silver, or mixtures thereof. To increase the thickness of the sheath so as to reduce its ohmic resistance, the sheath can often be associated with exterior strands of aluminum, copper and silver or any combination thereof. In the case of a metallic couple, such as for example, copper-aluminum, attention should be paid to thermoelectric couples which can occur when the temperature increases. However, this is not to be feared at the temperature of the cryostat.

The metallic sheath can advantageously be covered by an electrical insulating material such as the reaction product of adipic acid and hexamethylenediamine (nylon), polytetrafluoroethylene (Teflon), polyethylene terephthalate (Mylar), enamels and alumina when used on an aluminum sheath.

For most of the presently known superconducting materials, the critical temperature above which the superconducting properties disappear is about 18° K. This critical temperature, of course, varies somewhat depending on the material being considered. In the present invention, the liquefied gas contained in the cryostat can be helium, which has a boiling temperature of 4.2° K. at atmospheric pressure.

Since modifications of this invention will be apparent to those skilled in the art, it is not desired to limit the invention to the exact constitution shown and described.

We claim:

1. An apparatus for storing and releasing electrical energy which comprises a conducting circuit made of a material which is capable of assuming a normal state or a superconducting state, means for bringing said circuit to the superconducting state, an outer metallic sheath which covers said circuit over a part of its length, said sheath being in electrical contact with said circuit and having a low electrical resistance compared with the resistance of said circuit in the normal state, a switch means placed in said circuit in a zone which is not covered by said sheath, means for controlling said switch for opening said circuit, means for introducing an electrical current into said circuit and terminal conductors for coupling said sheath directly to a load circuit.

2. The apparatus of claim 1, wherein the means for bringing the conducting circuit to the superconducting state comprises a cryostatic vessel filled with a liquefied gas.

3. The apparatus of claim 2, wherein the conducting circuit is immersed in the cryostatic vessel and said vessel is filled with liquid helium.

4. The apparatus of claim 1, wherein the switch means is a system which permits the abrupt variation in the ohmic resistance of the superconducting circuit.

5. The apparatus of claim 1, wherein the switch means is composed of a resistance-type heater element.

6. The apparatus of claim 1, wherein the switch is controlled by a means which permits the transition of the switch from the superconducting state to the normal state.

7. The apparatus of claim 1, wherein the electrical resistance of said external metallic sheath is reduced by increasing the surface area of said sheath.

8. The apparatus of claim 7, wherein the electrical resistance of said external metallic sheath is reduced by increasing the thickness thereof.

9. The apparatus of claim 7, wherein the electrical resistance of said external metallic sheath is reduced by the addition of conductive elements.

10. The apparatus of claim 9, wherein said conductive elements are fabricated from the same metal as said sheath.

11. The apparatus of claim 9, wherein said conductive elements are fabricated from a metal which is different from the metal of said sheath.

12. The apparatus of claim 1, wherein the conducting circuit is constituted by at least one lead-wire which is wound in a coil around a core of electrical insulating material, the turns of said core being insulated from each other.

13. The apparatus of claim 1, wherein the conducting circuit is constituted by at least one lead-wire having a sheath formed by means of wires which are wound around said lead-wire.

14. The apparatus of claim 1, wherein the metallic sheath is copper or aluminum.

15. The apparatus of claim 1, wherein said sheath is covered with electrical insulating material.

References Cited

UNITED STATES PATENTS

| 3,263,133 | 7/1966 | Stekly | 317—123 |
| 3,267,306 | 8/1966 | Hassel et al. | 307—149 |
| 3,275,857 | 9/1966 | Freeman et al. | 307—149 |

LEE T. HIX, Primary Examiner

U.S. Cl. X.R.

307—104, 149, 306; 335—216